United States Patent
Fukumoto et al.

(10) Patent No.: US 8,795,859 B2
(45) Date of Patent: Aug. 5, 2014

(54) MAGNETIC RECORDING MEDIUM

(75) Inventors: Naoyuki Fukumoto, Hyogo (JP); Hiroshi Hatano, Osaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/805,938

(22) PCT Filed: Jun. 22, 2011

(86) PCT No.: PCT/JP2011/064214
§ 371 (c)(1),
(2), (4) Date: Dec. 20, 2012

(87) PCT Pub. No.: WO2011/162280
PCT Pub. Date: Dec. 29, 2011

(65) Prior Publication Data
US 2013/0101868 A1    Apr. 25, 2013

(30) Foreign Application Priority Data
Jun. 24, 2010  (JP) .................. 2010-144069

(51) Int. Cl.
*G11B 5/82*    (2006.01)
*G11B 5/187*    (2006.01)
*G11B 5/127*    (2006.01)

(52) U.S. Cl.
CPC ............ *G11B 5/82* (2013.01); *G11B 223/0064* (2013.01); *G11B 5/187* (2013.01); *G11B 5/127* (2013.01)
USPC .................. 428/846.9; 428/64.4; 360/135

(58) Field of Classification Search
CPC ............... G11B 5/187; G11B 23/0028; G11B 23/0064; G11B 2220/20; G11B 2220/2516; G11B 5/7315; G11B 5/73; G11B 5/82
USPC ............. 428/846.9, 64.4, 826, 823, 823.2; 360/59, 131, 135, 317, 128, 324.2; 369/13.02, 13.55; 438/691, 692, 693
See application file for complete search history.

(56) References Cited

U.S. PATENT DOCUMENTS

| | | | |
|---|---|---|---|
| 6,451,696 B1 * | 9/2002 | Hara et al. ................ | 438/691 |
| 2001/0048644 A1 * | 12/2001 | Ishii ............................ | 369/13.02 |
| 2002/0071223 A1 * | 6/2002 | Ghoshal ...................... | 360/128 |
| 2005/0193405 A1 | 9/2005 | Hattori et al. | |

(Continued)

FOREIGN PATENT DOCUMENTS

| JP | 2000-169184 | 6/2000 |
|---|---|---|
| JP | 2001-169184 | 6/2000 |

(Continued)

*Primary Examiner* — Kevin M. Bernatz
*Assistant Examiner* — Louis Falasco
(74) *Attorney, Agent, or Firm* — Brinks Gilson & Lione

(57) ABSTRACT

A magnetic recording medium includes, in a main surface of a glass substrate on which a magnetic recording layer is formed, a plurality of annular first thermally-conductive regions having a larger thermal conductivity than the glass substrate that are provided concentrically with the glass substrate. The first thermally-conductive regions are each provided so that it extends across a plurality of tracks. The first thermally-conductive region has a radial width larger than a depth, from the main surface, of the first thermally-conductive region.

6 Claims, 7 Drawing Sheets

(56) References Cited

U.S. PATENT DOCUMENTS

| | | | |
|---|---|---|---|
| 2005/0286178 A1* | 12/2005 | Gill et al. | 360/324.2 |
| 2006/0154110 A1* | 7/2006 | Hohlfeld et al. | 428/823 |
| 2006/0210838 A1 | 9/2006 | Kamimura et al. | |
| 2007/0184231 A1* | 8/2007 | Kuroda et al. | 428/64.4 |
| 2008/0170331 A1* | 7/2008 | Yoshitoku et al. | 360/135 |
| 2010/0081010 A1* | 4/2010 | Tatsugawa et al. | 428/800 |
| 2010/0177426 A1* | 7/2010 | Kanegae | 360/59 |

FOREIGN PATENT DOCUMENTS

| | | |
|---|---|---|
| JP | 2005-243186 | 9/2005 |
| JP | 2006-260620 | 9/2006 |
| JP | 2006-327935 | 12/2006 |
| JP | 2006-327936 | 12/2006 |
| JP | 2007-161552 | 6/2007 |
| JP | 2010-80025 | 4/2010 |
| WO | WO 2009/028570 | 3/2009 |

* cited by examiner

MAGNETIC RECORDING MEDIUM

RELATED APPLICATIONS

This is a U.S. National Phase Application under 35 USC 371 of International Application PCT/JP2011/064214 filed on Jun. 22, 2011.

This application claims the priority of Japanese application no. 2010-144069 filed Jun. 24, 2010, the entire content of which is hereby incorporated by reference.

TECHNICAL FIELD

The present invention relates to a magnetic recording medium suitable as a substrate for information recording media such as hard disk (HDD), particularly a substrate for heat-assisted recording media.

BACKGROUND ART

Conventionally, as a substrate for information recording media such as hard disk (HDD), an aluminum alloy has been used. The aluminum alloy, however, involves problems such as that the aluminum alloy is likely to deform and that the smoothness of the substrate surface after being polished is inadequate, and therefore currently glass substrates are widely used (see for example PTL 1 to PTL 6).

CITATION LIST

Patent Literature

PTL 1: Japanese Laid-Open Patent Publication No. 2010-080025
PTL 2: Japanese Laid-Open Patent Publication No. 2000-169184
PTL 3: Japanese Laid-Open Patent Publication No. 2006-327935
PTL 4: Japanese Laid-Open Patent Publication No. 2006-327936
PTL 5: Japanese Laid-Open Patent Publication No. 2007-161552
PTL 6: WO2009/028570

SUMMARY OF INVENTION

Technical Problem

Recently, the information recording media as described above have been required to have an ultrahigh recording density, as the amount of information to be recorded on the recording media has been increasing. Since the magnetic recording is used as means for recording, an increased recording density is accompanied by a weakened recording coercivity, resulting in a problem that recorded information is lost due to the influence of heat generated during recording, which is known as so-called "thermal fluctuation."

When information is to be recorded on a heat-assisted magnetic disk, a recording area of a magnetic recording film of the disk where the information is to be recorded is heated. Then, not only the recording area where the information is to be recorded but also its surrounding area is significantly increased in temperature. It is preferable for the heat-assisted magnetic disk that the coercivity of its magnetic recording film is higher in order to achieve a higher recording density. A higher coercivity of the magnetic recording film requires that the extent to which the magnetic recording film is heated should be intensified when information is to be recorded.

Regarding the conventional heat-assisted magnetic disk, however, if the extent to which the magnetic recording film is heated is excessively intensified and accordingly an excessively large region of the magnetic recording film is heated to a predetermined temperature or more, the heat could be transmitted to sectors adjacent to the magnetically recorded sector and to sectors of radially inside and radially outside tracks (hereinafter adjacent sectors), resulting in an influence on the state of magnetic recording of the adjacent sectors (cross-write phenomenon).

In order to overcome the problem of the cross-write phenomenon, PTL 1 discloses a structure in which a thermally conductive region is provided between tracks so as to suppress expansion of heat. In the case where the thermally conductive region is provided between tracks, however, the surface roughness of the thermally conductive region is rougher than the surface of the glass substrate, and accordingly the surface roughness of the thermally conductive region influences the surface roughness of the magnetic recording film. Consequently, when the recorded information is to be read by means of a magnetic recording head, the magnetic recording head could collide with the glass substrate to cause a read error.

The present invention has been made in view of the present circumstances as described above, and an object of the invention is to provide a magnetic recording medium that enables the cross-write phenomenon to be suppressed and the rate of occurrence of read errors to be reduced.

Solution to Problem

A magnetic recording medium based on the present invention is a magnetic recording medium used for heat-assisted recording, including: a glass substrate having a shape of an annular disk; and a magnetic recording layer provided on at least one of two main surfaces of the glass substrate and including a plurality of annular tracks defined as being arranged in a radial direction, the tracks having a plurality of sectors into which the tracks are divided in a circumferential direction to serve as recording regions. In the main surface of the glass substrate on which the magnetic recording layer is formed, a plurality of annular first thermally-conductive regions having a larger thermal conductivity than the glass substrate is provided concentrically with the glass substrate. Each first thermally-conductive region is provided so that the first thermally-conductive region extends across a plurality of the tracks. The first thermally-conductive regions each have a radial width larger than a depth, from the main surface, of the first thermally-conductive region.

In another embodiment, the depth, from the main surface, of the first thermally-conductive region is not less than 5 nm and less than 20 nm.

In another embodiment, an area of the first thermally-conductive regions disposed per unit area of the glass substrate is larger as the area of the first thermally-conductive regions is located closer to an inner circumferential periphery of the glass substrate.

In another embodiment, a second thermally-conductive region is further included that extends in the radial direction of the glass substrate so that the second thermally-conductive region crosses the first thermally-conductive regions, and having a larger thermal conductivity than the glass substrate.

In another embodiment, a depth, from the main surface, of the second thermally-conductive region is not less than 5 nm and less than 20 nm.

In another embodiment, an area of the second thermally-conductive region disposed per unit area of the glass substrate is larger as the area of the second thermally-conductive region is located closer to an inner circumferential periphery of the glass substrate.

Advantageous Effects of Invention

The magnetic recording medium based on the present invention can provide the magnetic recording medium that enables the cross-write phenomenon to be suppressed and the rate of occurrence of read errors to be reduced.

DESCRIPTION OF EMBODIMENTS

Figure 1:
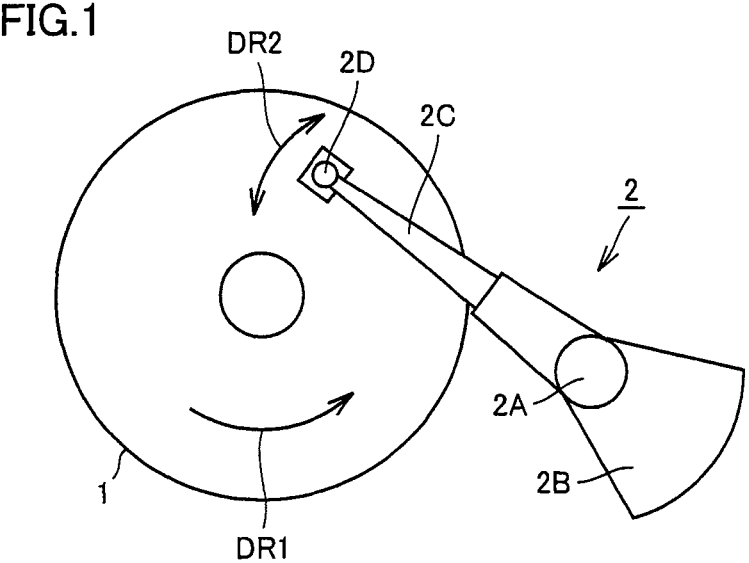
FIG. 1 is a plan view showing a general configuration of a heat-assisted magnetic recording apparatus in an embodiment.

A magnetic recording medium and a method for manufacturing the same based on the present invention will be described hereinafter with reference to the drawings. Regarding embodiments described below, in the case where the number, the amount or the like is mentioned, the scope of the present invention is not necessarily limited to the mentioned number, amount, or the like unless otherwise specified.

In addition, the same components or the components corresponding to each other are denoted by the same reference numerals and a description thereof may not be repeated depending on the case. It is originally intended that features of each embodiment are appropriately combined to be used.

<General Configuration of Heat-Assisted Magnetic Recording Apparatus 2>

Figure 3:
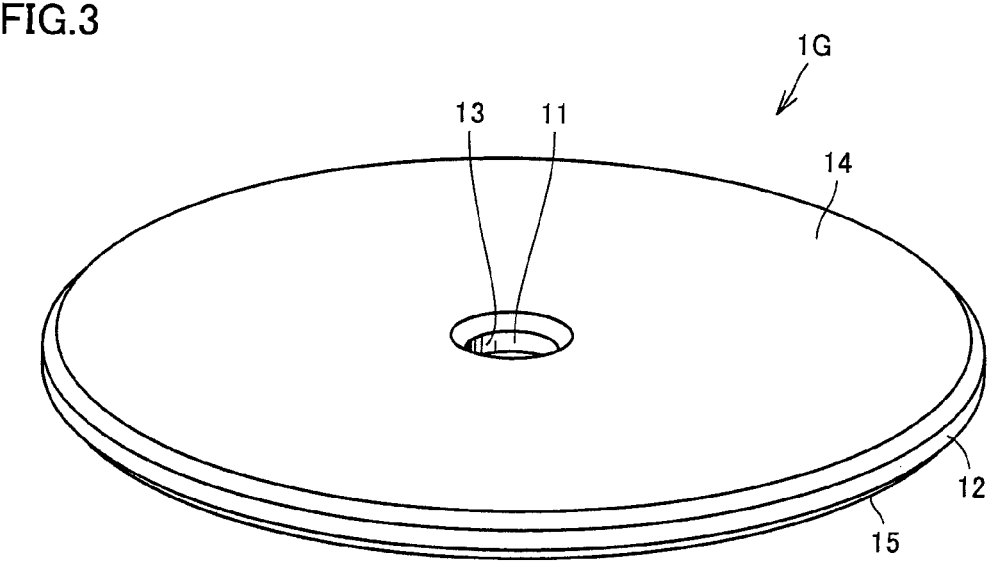
FIG. 3 is a perspective view showing a glass substrate used for a magnetic disk in an embodiment.
Figure 4:
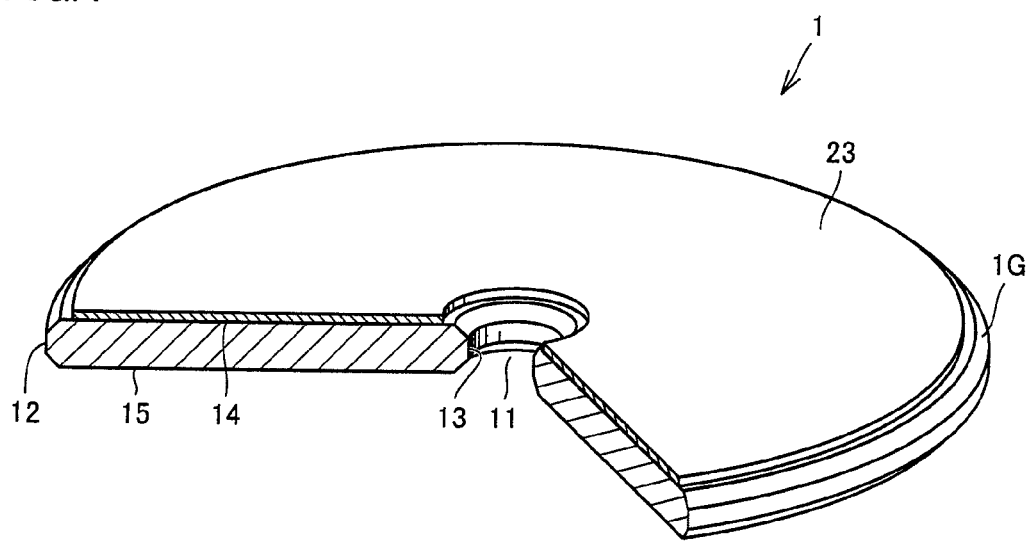
FIG. 4 is a perspective view showing a magnetic disk in an embodiment.
Figure 5:
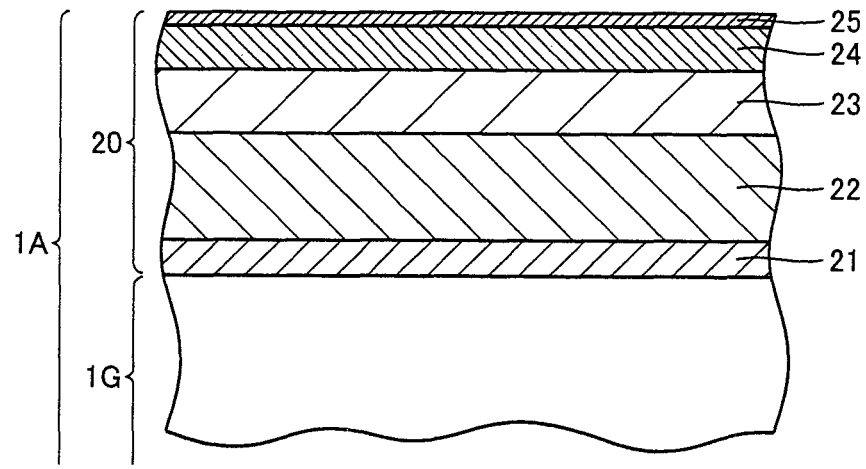
FIG. 5 is a partially enlarged cross-sectional view of another magnetic disk in an embodiment.
Figure 6:
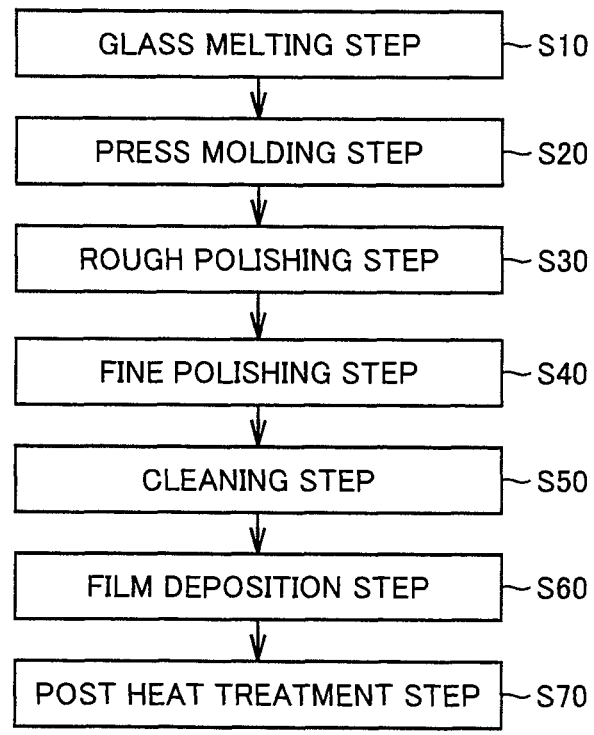
FIG. 6 is a flow diagram showing steps through which a magnetic disk is manufactured in an embodiment.

First, referring to FIGS. 1 to 6, an example of the general configuration of a heat-assisted magnetic recording apparatus 2 will be described. FIG. 1 is a plan view showing a general configuration of heat-assisted magnetic recording apparatus 2, FIG. 2 is a side view showing the general configuration of heat-assisted magnetic recording apparatus 2, FIG. 3 is a perspective view showing a glass substrate 1G used for a magnetic disk 1, FIG. 4 is a perspective view showing magnetic disk 1, FIG. 5 is a partially enlarged cross-sectional view of another magnetic disk 1A, and FIG. 6 is a flow diagram showing steps through which a magnetic disk is manufactured.

As shown in FIG. 1, heat-assisted magnetic recording apparatus 2 includes a magnetic recording head 2D disposed opposite to magnetic disk 1 adapted to heat-assisted magnetic recording that is a magnetic recording medium rotatably driven in the direction of an arrow DR1.

Magnetic recording head 2D is mounted on the leading end of a suspension 2C. Suspension 2C is provided so that it is pivotable in the direction of an arrow DR2 (tracking direction) on a pivot 2A. To pivot 2A, a tracking actuator 2B is attached.

Figure 2:
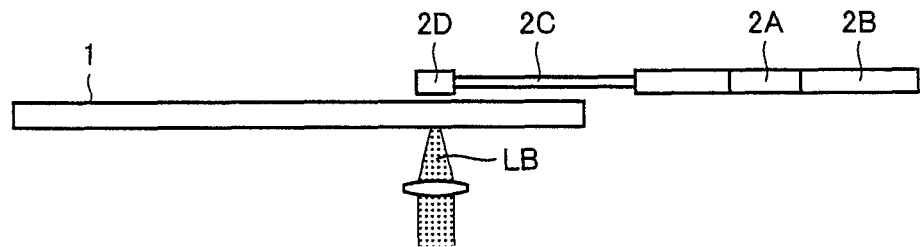
FIG. 2 is a side view showing the general configuration of the heat-assisted magnetic recording apparatus in an embodiment.

As shown in FIG. 2, to the side opposite to magnetic recording head 2D with respect to magnetic disk 1, a laser beam LB is applied. A portion of magnetic disk 1 on which data is to be recorded is momentarily heated by laser beam LB and accordingly the data is recorded on magnetic disk 1 by magnetic recording head 2D.

Magnetic particles of a magnetic layer formed in magnetic disk 1 have a coercivity that is decreased as the temperature thereof increases. Then, laser beam LB is used to heat the magnetic layer to thereby enable recording with a common magnetic recording head 2D even if the magnetic layer has a high coercivity at normal temperature. Thus ultrahigh density recording can be achieved.

While the position of magnetic recording head 2D and the position where laser beam LB is applied are herein opposite to each other with respect to the magnetic disk, they may be arranged on the same side with respect to magnetic disk 1 in order to simplify the configuration and the positional control of the head. Particularly in the case where both sides of magnetic disk 1 are used as recording surfaces, they are arranged on the same side with respect to the disk.

<Configuration of Magnetic Disk 1>

Next, referring to FIGS. 3 and 4, a configuration of magnetic disk 1 will be described. FIG. 3 is a perspective view showing glass substrate 1G used for magnetic disk 1, and FIG. 4 is a perspective view showing magnetic disk 1.

As shown in FIG. 3, glass substrate 1G used for magnetic disk 1 has a shape of an annular disk with a hole 11 formed at its center. Glass substrate 1G has an outer peripheral end face 12, an inner peripheral end face 13, a front main surface 14, and a rear main surface 15. Glass substrate 1G has a size, for example, of an outer diameter of about 64 mm, an inner diameter of about 20 mm, and a thickness of about 0.8 mm.

In the main surface on which a magnetic layer 23, which will be described later herein, of glass substrate 1G is formed, a plurality of annular thermally-conductive regions are provided concentrically with glass substrate 1G. Details of the structure of the thermally conductive regions will be described later herein.

As shown in FIG. 4, magnetic disk 1 has magnetic layer 23 formed on front main surface 14 of glass substrate 1G described above. While magnetic layer 23 as shown is formed on only front main surface 14, magnetic layer 23 may also be provided on rear main surface 15 (see FIG. 11).

As a method for forming magnetic layer 23, a conventionally known method may be used. For example, a method may be used according to which a thermosetting resin in which magnetic particles are dispersed is applied onto a substrate by spin coating, or a sputtering or electroless plating method, to form the magnetic layer.

In the case of the spin coating method, the magnetic layer has a thickness of about 0.3 µm to 1.2 µm. In the case of the sputtering method, the magnetic layer has a thickness of about 0.04 µm to 0.08 µm. In the case of the electroless plating method, the magnetic layer has a thickness of 0.05 µm to 0.1 µm. In order to have a thinner layer and a higher density, the sputtering method and the electroless plating method are preferably used to form the layer.

The magnetic material used for magnetic layer 23 is not particularly limited, and a conventionally known material may be used for magnetic layer 23. A preferred material is, for example, a Co-based alloy in which Co having a high crystal anisotropy is a basic material for the purpose of obtaining a high coercivity, to which Ni and/or Cr are/is added for the purpose of adjusting the residual magnetic flux density. In these years, as a preferred magnetic material for heat-assisted recording, a FePt-based material has become used.

In order to allow the magnetic recording head to slide more smoothly, the surface of magnetic layer 23 may be coated with a thin layer of a lubricant. An example of the lubricant may be perfluoropolyether (PFPE), which is a liquid lubricant, diluted with a solvent such as Freon-based material.

In addition, an underlying layer and/or a protective layer may be provided as required. The underlying layer of the magnetic disk is selected depending on the magnetic layer. The material for the underlying layer may for example be at least one material selected from nonmagnetic metals such as Cr, Mo, Ta, Ti, W, V, B, Al, and Ni.

The underlying layer is not limited to a single layer. The underlying layer may have a multilayer structure in which the same or different layers are stacked. For example, the underlying layer may be a multilayered underlying layer such as Cr/Cr, Cr/CrMo, Cr/CrV, NiAl/Cr, NiAl/CrMo, NiAl/CrV, and the like.

Examples of the protective layer provided for preventing wear and corrosion of magnetic layer 23 may be Cr layer, Cr alloy layer, carbon layer, hydrogenated carbon layer, zirconia layer, silica layer, and the like. These protective layers can each be formed successively, together with the underlying layer and the magnetic layer, by means of an in-line sputtering apparatus. These protective layers may each be a single layer or have a multilayer structure made up of the same or different layers.

On the above-described protective layer, or instead of the protective layer, another protective layer may be formed. For example, instead of the above-described protective layer, tetraalkoxysilane diluted with an alcohol-based solvent in which fine particles of colloidal silica are dispersed may be applied onto a Cr layer, and further baked to form a silicon oxide ($SiO_2$) layer.

<Magnetic Disk 1A>

FIG. 5 shows an example of the configuration of another magnetic disk 1A. FIG. 5 is a partially enlarged cross-sectional view of another magnetic disk 1A. This magnetic disk 1A includes a magnetic recording layer 20 having a plurality of layers on glass substrate 1G.

Magnetic recording layer 20 includes a seed (roughness control) layer 21 made of AlN or the like and formed directly on front main surface 14 of glass substrate 1G, an underlying layer 22 with a thickness of about 60 nm formed on seed (roughness control) layer 21, magnetic layer 23 with a thickness of about 30 nm formed on underlying layer 22, a protective layer 24 with a thickness of about 10 nm formed on magnetic layer 23, and a lubricating layer 25 with a thickness of about 0.8 nm formed on protective layer 24.

The configuration of above-described magnetic disk 1A is illustrated merely by way of example. The size of glass substrate 1G and the configuration of magnetic recording layer 20 are appropriately changed depending on the required performance of magnetic disk 1A.

<Steps Through which Glass Substrate 1G is Manufactured>

Next, the flowchart of FIG. 6 will be used to describe a method for manufacturing magnetic disk 1A including a glass substrate according to the present embodiment.

First, in "glass melting step" of step 10 (hereinafter abbreviated as "S10," step 20 and subsequent steps will be abbreviated similarly), a glass material which is to form the substrate is melted. Next, in "press molding step" of S20, the melted glass is poured onto a lower mold and press-molded by an upper mold.

In "rough polishing step" of S30, the surface of the press-molded glass substrate is polished to make preliminary adjustments of the flatness or the like of the glass substrate. Furthermore, in "fine polishing step" of S40, the glass substrate is polished again to make fine adjustments of the flatness or the like. The steps through which thermally conductive regions are produced will be described later herein.

Then, in "cleaning step" of S50, the glass substrate is cleaned. Through the above-described steps, the glass substrate applicable to a substrate for a hard disk is obtained.

Furthermore, in "film deposition step" of S60, a film which is to serve as a recording layer is formed on the above-described glass substrate. Finally, in "post heat treatment step" of S70, heat treatment with the purpose of improving the magneto crystalline anisotropy is performed. The heating temperature is about 600° C. In this way, a hard disk (magnetic disk) is completed.

<First Thermally-Conductive Region 101>

Figure 7:
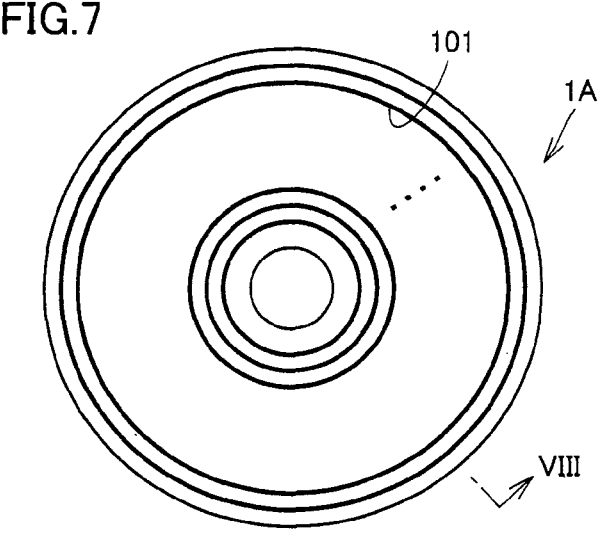
FIG. 7 is a schematic plan view showing an arrangement of thermally conductive regions provided in a magnetic disk in an embodiment.
Figure 8:
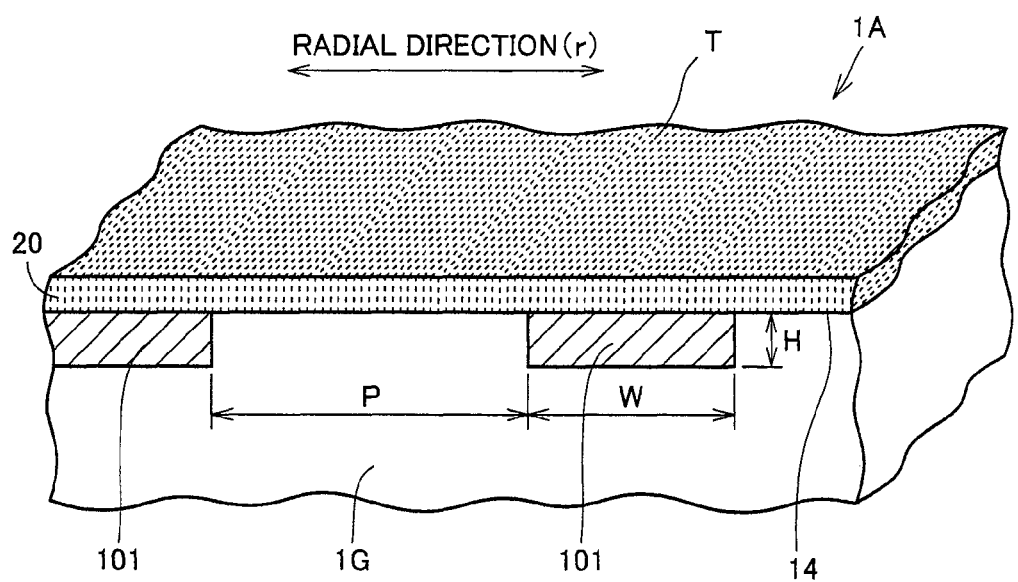
FIG. 8 is a partially enlarged cross-sectional view along line VIII in FIG. 7, as seen in the direction indicated by the arrow in FIG. 7.
Figure 9:
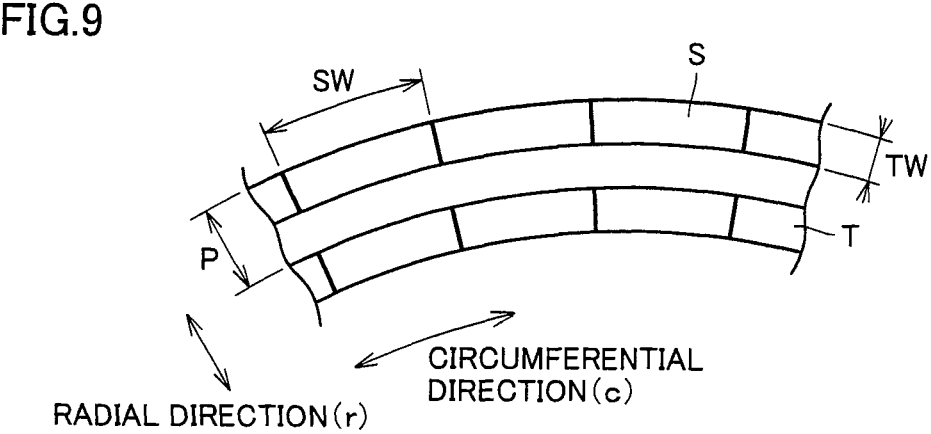
FIG. 9 is a plan view schematically showing tracks and sectors of a magnetic disk in an embodiment.

Referring next to FIGS. 7 to 9, a detailed description will be given of a first thermally-conductive region 101 provided in magnetic disk 1A of the present embodiment. FIG. 7 is a schematic plan view of magnetic disk 1A showing an arrangement of first thermally-conductive regions 101, FIG. 8 is a partially enlarged cross-sectional view along line VIII in FIG. 7, as seen in the direction indicated by the arrow in FIG. 7, and FIG. 9 is a plan view schematically showing tracks T and sectors S of magnetic disk 1A.

Referring to FIGS. 7 and 8, in the main surface of glass substrate 1G on which magnetic recording layer 20 is formed, a plurality of annular first thermally-conductive regions 101 having a larger thermal conductivity than glass substrate 1G are provided concentrically with glass substrate 1G. These first thermally-conductive regions 101 are each provided so that the thermally-conductive region extends across tracks T which are regions of magnetic recording layer 20 on which information is to be magnetically recorded. The broken lines shown in magnetic recording layer 20 of FIG. 20 are indicated to represent imaginary tracks T and thus do not conform with the actual width and the actual track pitch of tracks T.

In the present embodiment, the radial (r) pitch (P) between first thermally-conductive regions 101 adjacent to each other is about 0.25 μm to about 0.5 μm, the radial (r) width (W) of first thermally-conductive region 101 is about 0.1 μm to about 0.2 μm, and the depth (H) of first thermally-conductive region 101 from main surface 14 of glass substrate 1G is not less than about 0.005 μm (5 nm) and less than about 0.02 μm (20 nm). The first thermally-conductive region 101 is provided so that its width (W) is larger than its depth (H).

Referring here to FIG. 9, in the case where the recording density of magnetic disk 1A is 1000 Gbit per square inch for example, the circumferential (c) width (SW) of one sector S is about 100 nm, the radial (r) width (TW) of track T is about 10 nm, and the track pitch (TP) is about 150 nm. Accordingly, in the case where the radial (r) width (W) of first thermally-conductive region 101 is about 0.15 μm, one first thermally-conductive region 101 is provided to extend across about 15 tracks T.

For first thermally-conductive region 101, a high thermal conductivity material such as Ag, Ag alloy (AgSi for example), Al, Al alloy, Au, Cu or the like is preferably used as a material having a higher thermal conductivity than glass substrate 1G. While glass substrate 1G has a thermal conductivity of about 0.6 W/m·k, the aforementioned high thermal conductivity materials have a thermal conductivity of about 200 W/m·k to about 400 W/m·k. Regarding recording of information on magnetic disk 1A, a larger amount of thermal energy is applied per unit time as track T on which information is to be recorded is located closer to the inner circumferential periphery. It is therefore preferable that the area of first thermally-conductive regions 101 disposed per unit area of glass substrate 1G is larger as this area of first thermally-conductive regions is closer to the inner circumferential periphery of glass substrate 1G.

For example, in the case where respective radial (r) widths (W) of a plurality of first thermally-conductive regions 101 are all identical to each other, it is preferable that the radial (r) pitch between first thermally-conductive regions 101 is smaller (0.1 μm to 0.3 μm) as first thermally-conductive regions 101 are located closer to the inner circumferential periphery. In the case where respective radial (r) widths (W) of a plurality of first thermally-conductive regions 101 are different from each other, it is preferable that the radial (r) width (W) of first thermally-conductive regions 101 is larger as first thermally-conductive regions 101 are located closer to the inner circumferential periphery.

<Method for Producing First Thermally-Conductive Regions 101>

Next, referring to FIGS. 10 to 13, a method for producing first thermally-conductive regions 101 will be described. FIGS. 10 to 13 are first to fourth cross sectional views showing steps through which thermally-conductive regions provided in a magnetic disk are produced.

Figure 10:
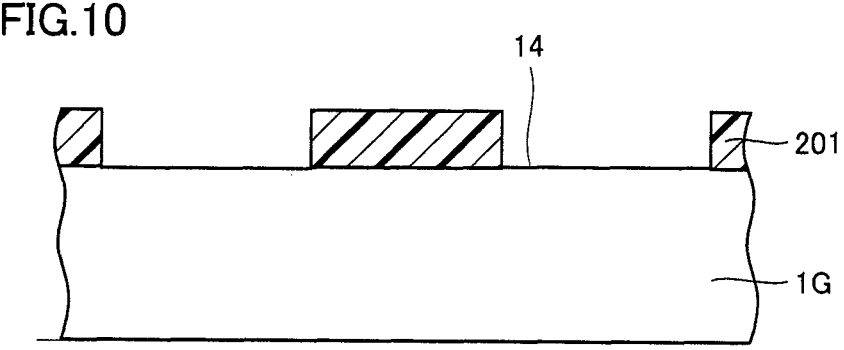
FIG. 10 is a first cross-sectional view showing a step in producing thermally conductive regions provided in a magnetic disk in an embodiment.
Figure 11:
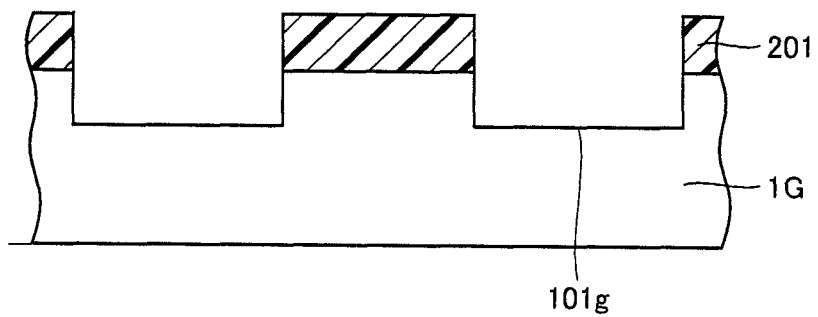
FIG. 11 is a second cross-sectional view showing a step in producing thermally conductive regions provided in the magnetic disk in an embodiment.

Referring to FIG. 10, a resist mask 201 in which a predetermined opening pattern is formed is formed on front main surface 14 of glass substrate 1G. Then, as shown in FIG. 11, resist mask 201 is used to etch glass substrate 1G so as to form a plurality of grooves 101g.

Figure 12:
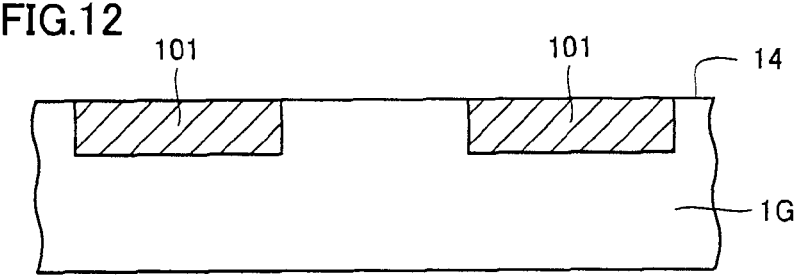
FIG. 12 is a third cross-sectional view showing a step in producing thermally conductive regions provided in the magnetic disk in an embodiment.

Then, referring to FIG. 12, a predetermined high-thermal-conductivity material is deposited in each groove 101g by means of the sputtering method from above resist mask 201 having openings corresponding to grooves 101g. As the high-thermal-conductivity material, the above-described Ag, Ag alloy (AgSi for example), Al, Al alloy, Au, Cu, or the like is used. Accordingly, first thermally-conductive regions 101 are formed in grooves 101g. After this, resist mask 201 is removed from above glass substrate 1G.

Here, in order to give a higher thermal conductivity to a thermally conductive portion located closer to the inner circumferential periphery of glass substrate 1G, a plurality of targets made of respective materials having respective thermal conductivities different from each other may be used for the sputtering method, for example, respective deposition rates of the materials for grooves 101g may be made different from each other, and the high thermal conductivity materials that are different from each other in terms of the ratio between their components are deposited in respective grooves 101g.

Figure 13:
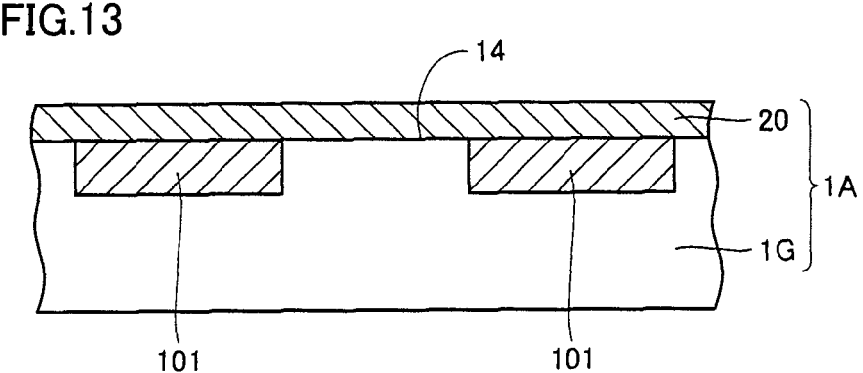
FIG. 13 is a fourth cross-sectional view showing a step in producing thermally conductive regions provided in the magnetic disk in an embodiment.

Next, referring to FIG. 13, magnetic recording layer 20 is formed on front main surface 14 of glass substrate 1G. In magnetic recording layer 20, a seed (roughness control) layer, an underlying layer, a magnetic layer, a protective layer, and a lubricating layer for example, which have been described herein with reference to FIG. 5, are deposited by the sputtering method. In this way, magnetic disk 1A is completed.

As seen from the foregoing, magnetic disk 1A of the present embodiment includes, in the main surface of glass substrate 1G on which magnetic recording layer 20 is formed, a plurality of annular first thermally-conductive regions 101 that are concentric with glass substrate 1G. These first thermally-conductive regions 101 are each provided so that the thermally-conductive region extends across tracks T which are regions of magnetic recording layer 20 on which information is to be magnetically recorded.

Accordingly, when a laser beam is used to perform heating for recording information on sectors, heat dissipation is promoted by first thermally-conductive regions 101. Therefore, occurrence of the cross-write phenomenon, which influences the state of magnetic recording of adjacent sectors, can be suppressed.

When first thermally-conductive region 101 is produced, first thermally-conductive region 101 is formed so that its width (W) is larger than its depth (H) and the depth (H) is a relatively shallow depth of about 15 nm.

Accordingly, the surface roughness of first thermally-conductive region 101 produced by means of the sputtering method can be reduced relative to the surface roughness of first thermally-conductive region 101 having a depth of 20 nm to 100 nm. Consequently, the influence of the surface roughness of first thermally-conductive region 101 on the surface roughness of magnetic recording layer 20 can be suppressed.

This is for the following reason. In the case where a film is deposited by means of the sputtering method, the film is deposited while particles which are to form the film are being grown. Therefore, a film having a greater thickness involves particles of a greater size. As a result, the surface roughness of the deposited film depends on the size of the deposited particles of the completed film.

Accordingly, the negative influence of the provision of first thermally-conductive regions 101 on the surface roughness of magnetic recording layer 20 is suppressed and, when recorded information is to be read by means of a magnetic recording head, occurrence of a read error due to collision of the magnetic recording head with magnetic disk 1A can be suppressed.

Figure 14:
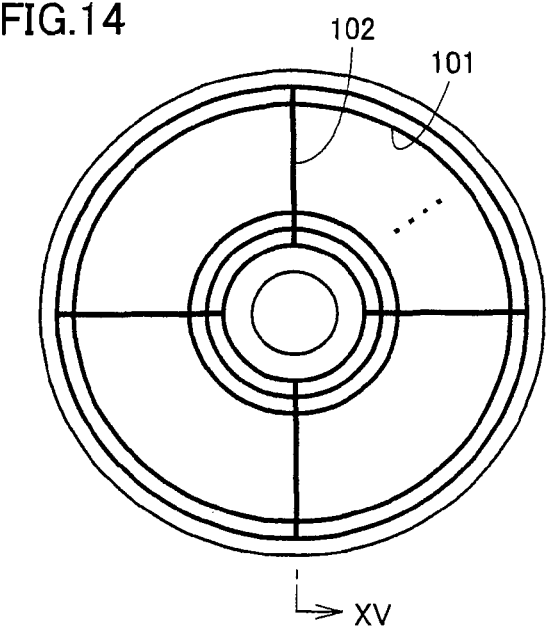
FIG. 14 is a schematic plan view showing another arrangement of thermally-conductive regions provided in a magnetic disk in an embodiment.
Figure 15:
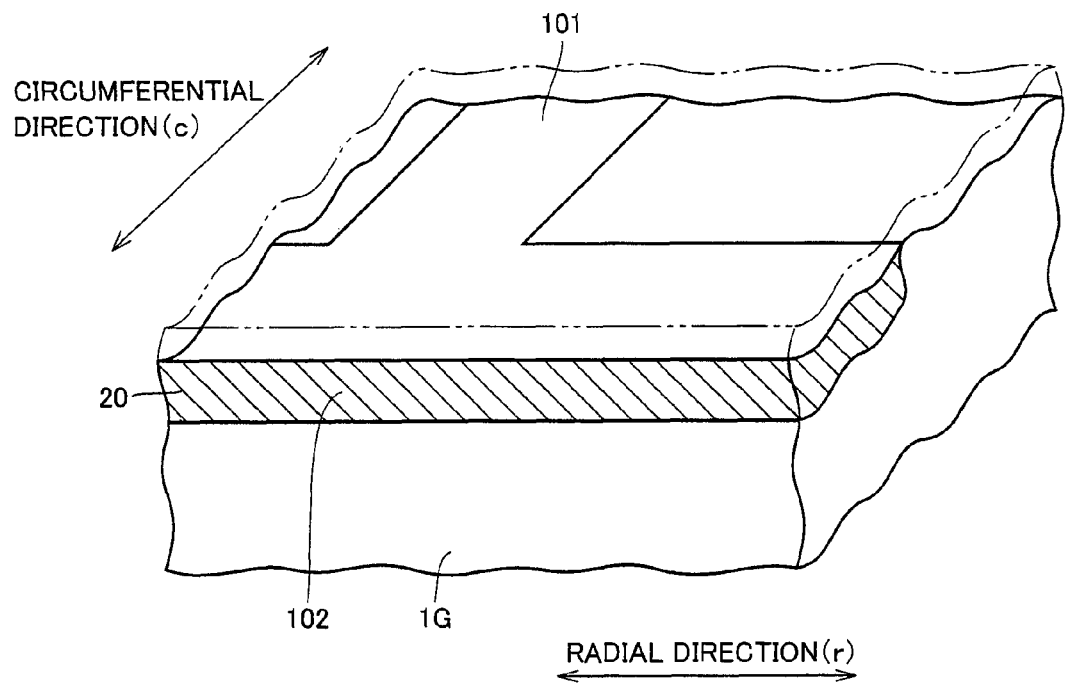
FIG. 15 is a partially enlarged cross-sectional view along line XV in FIG. 14, as seen in the direction indicated by the arrow in FIG. 14.

Regarding first thermally-conductive region 101 in the embodiment above, it has been described herein that a plurality of annular first thermally-conductive regions 101 are provided concentrically with glass substrate 1G. However, as shown in FIGS. 14 and 15, a second thermally-conductive region 102 that extends radially (r) to cross first thermally-conductive regions 101 can also be provided. The depth and the width (in the circumferential direction (c)) of second thermally-conductive region 102 are similar to those of first thermally-conductive region 101. While FIG. 14 shows that four second thermally-conductive regions 102 are provided at a pitch of 90°, the number of second thermally-conductive regions 102 is selected as appropriate.

Since it is preferable that the effect of diffusing heat is greater in regions closer to the inner circumferential periphery, it should accordingly be preferable that the area of second thermally-conductive region 102 disposed per unit area of glass substrate 1G is larger as it is located closer to the inner circumferential periphery of glass substrate 1G. For example, it is preferable that the radial (r) width of second thermally-conductive region 102 increases toward the inner circumferential periphery of glass substrate 1G.

As to the circumferential (c) width of second thermally-conductive region, since this circumferential width is about 0.1 μm to about 0.2 μm and the width (SW) of one sector S is about 0.05 μm to about 0.1 μm, one second thermally-conductive region 102 extends across one to two sectors S, which is similar to first thermally-conductive region 101.

Figure 16:
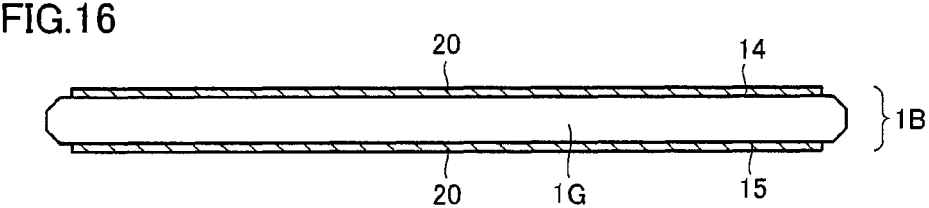
FIG. 16 is a cross-sectional view of another magnetic disk in an embodiment.

Regarding the above-described embodiment, the case has been described that the magnetic recording layer is provided on the front main surface 14 side of glass substrate 1G. However, as shown in FIG. 16, a magnetic recording layer may also be provided on the rear main surface 15 side of glass substrate 1G. In this case, thermally-conductive regions are also provided on the rear main surface 15 side.

It should be construed that embodiments and examples disclosed herein are by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1, 1A, 1B magnetic disk; 1G glass substrate; 2 heat-assisted magnetic recording apparatus; 2A pivot; 2B tracking actuator; 2C suspension; 2D magnetic recording head; 11 hole; 12 outer peripheral end face; 13 inner peripheral end face; 14 front main surface; 15 rear main surface; 20 magnetic recording layer; 21 seed (roughness control) layer; 22 underlying layer; 23 magnetic layer; 24 protective layer; 25 lubricating layer; 101 first thermally-conductive region; 102 second thermally-conductive region

The invention claimed is:

1. A magnetic recording medium used for heat-assisted recording, comprising:
 a glass substrate having a shape of an annular disk; and
 a magnetic recording layer provided on at least one of two main surfaces of said glass substrate and including a plurality of annular tracks arranged in a radial direction, each of said plurality of annular tracks having a plurality of sectors into which each track of said plurality of annular tracks are divided in a circumferential direction to provide recording regions,
 a plurality of annular first thermally-conductive regions having a larger thermal conductivity than said glass substrate, provided concentrically with said glass substrate and arranged at said main surface of said glass substrate on which said magnetic recording layer is formed, each annular first thermally-conductive region of said plurality of annular first thermally-conductive regions being provided so that said first thermally-conductive region extends across a plurality of said annular tracks, and each annular first thermally-conductive region of said plurality of annular first thermally-conductive regions having a radial width larger than a depth, from said main surface, of said annular first thermally-conductive region.

2. The magnetic recording medium according to claim 1, wherein said depth, from said main surface, of said annular first thermally-conductive region is not less than 5 nm and less than 20 nm.

3. The magnetic recording medium according to claim 1, wherein an area of each of said plurality of annular first thermally-conductive regions disposed per unit area of said glass substrate increases as said area of each of said plurality of said first annular thermally-conductive regions is located proximate to an inner circumferential periphery of said glass substrate.

4. The magnetic recording medium according to claim 1, further comprising:
 a second thermally-conductive region extending in the radial direction of said glass substrate so that said second thermally-conductive region crosses each of said plurality of annular first thermally-conductive regions;
 wherein said second thermally-conductive region has a larger thermal conductivity than said glass substrate.

5. The magnetic recording medium according to claim 4, wherein a depth, from said main surface, of said second thermally-conductive region is not less than 5 nm and less than 20 nm.

6. The magnetic recording medium according to claim 4, wherein an area of said second thermally-conductive region disposed per unit area of said glass substrate increases as said area of said second thermally-conductive region is located proximate to an inner circumferential periphery of said glass substrate.

* * * * *